(12) United States Patent
Thandiwe

(10) Patent No.: US 6,707,272 B1
(45) Date of Patent: Mar. 16, 2004

(54) PULSE CHARGING CIRCUIT AND METHOD

(75) Inventor: Iilonga Thandiwe, Atlanta, GA (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/302,479

(22) Filed: Nov. 22, 2002

(51) Int. Cl.⁷ .............................................. H01M 10/44
(52) U.S. Cl. ....................................................... 320/141
(58) Field of Search ................................ 320/125, 128, 320/137, 139, 141, 160

(56) References Cited

U.S. PATENT DOCUMENTS

| | | |
|---|---|---|
| 5,541,491 A | 7/1996 | Yamazaki et al. |
| 5,640,080 A | 6/1997 | Tamai et al. |
| 5,747,969 A | 5/1998 | Tamai |
| 5,808,447 A | 9/1998 | Hagino |
| 5,828,202 A | 10/1998 | Tamai |
| 5,905,364 A | 5/1999 | Ookita |
| 5,945,811 A | 8/1999 | Hasegawa et al. |
| 6,127,804 A | 10/2000 | Oglesbee et al. |

*Primary Examiner*—Edward H Tso
(74) *Attorney, Agent, or Firm*—Philip H. Burrus, IV

(57) ABSTRACT

A circuit and method are disclosed for pulse charging a battery. In this method, the duration of the charging interval of the pulse is governed by the time required to reach an upper threshold voltage. The duration of the non-charging interval is a function of the ionic relaxation of the battery. One preferred embodiment includes a method in which the charging interval is initiated at a voltage that corresponds to the current state of charge of the cell. For example, when the upper threshold is reached, charging is suspended. A microprocessor then determines the state of charge by way of a fuel gauge. If a cell is 70% charged, for instance, an on voltage corresponding to this state of charge is selected. When the cell reaches the on voltage, the charging interval is again initiated. Other alternatives to this method include sensing a slope to determine when ionic relaxation has occurred, and a mathematical approximation of the method.

13 Claims, 6 Drawing Sheets

PULSE CHARGING CIRCUIT AND METHOD

BACKGROUND

1. Technical Field

This invention relates generally to rapid charging of lithium-based batteries, and more specifically to a circuit and method for modulating pulsed current in a rapid charging system.

2. Background Art

Nothing is more frustrating that a dead battery. If you are hungry, and want to order a pizza, the hunger pangs pang much louder when you pick up your cellular phone to call in the order and find that the battery is dead. Similarly, if you attempt to check your schedule in your personal digital assistant (PDA) and find that the battery is dead, you run the risk of missing your job interview, your reminder to pick up a loaf of bread at the store, or the worst case scenario: your anniversary. Tell your spouse, "my battery was dead," and you'll end up sleeping on the sofa.

When people do find that the battery in their phone, radio, pager, laptop computer, PDA, or MP3 player is dead, they want to charge it as quickly as possible. No one likes waiting around two hours for a phone to charge. You could have made a pizza from scratch in that time. Consequently, battery charger designers are constantly working on ways to charge batteries faster.

By way of background, several prior art methods are known for charging batteries. For example, a constant-current, constant-voltage (CCCV) method is widely used. This method allows for the charging a battery with a constant charge current till a voltage threshold is reached (e.g. 4.2 V in single cell applications), after which the charge is continued by holding the lithium-based batteries at the voltage threshold of 4.2 V and continuing to provide current, wherein the current tapers sufficiently to maintain the 4.2 V threshold. When the current has fallen to a minimum threshold, a full charge indication is made and/or the charging is terminated. This method is effective at fully charging a battery, but it demands a charger that is capable of implementing the above regime. For a variety of reasons: cost, complexity, legacy system compatibility; a CCCV charger is neither preferred nor acceptable in some host power systems. Moreover, often for cost and design simplicity, the battery will have no control or influence over the charging parameters inherent in the charger, such as voltage or current. Finally, a certain battery may be expected to work with a variety of chargers where each charger has a different or unknown charging parameters.

In addition to the problems listed above, CCCV chargers may also become problematic when trying to reduce charge time. The way to rapidly charge a battery with a CCCV charger is to set the current limit very high so as to simply dump large amounts of current into the battery. Putting large amounts of current in, however, can be like trying to get a square peg into a round hole due to a phenomenon known as "ionic relaxation." Ionic relaxation is known in the art. It was recited, for example, in U.S. Pat. No. 6,127,804, issued Oct. 3, 2000, entitled "Lithium Ion Charging Means and Method Using Ionic Relaxation Control", which is incorporated herein by reference for all purposes. For convenience, the fundamentals of ionic relaxation will be recited in the following paragraph.

Without being bound by theory, lithium-based batteries have active particles called ions that convert chemical energy to electrical energy. When a rechargeable lithium battery has been at rest for some time, i.e. with no charger or load attached, the ions become evenly dispersed throughout the cell. Evenly dispersed refers to a state where the electric field is evenly distributed, resulting in an electric field gradient of zero across the cell. This state may be referred to as "ionic rest" as there is no migration of ions within the cell.

When an external voltage, current, or load is applied to a cell, the electric field gradient is disturbed and the ions migrate to accommodate the new external terminal voltage requirements. This state may be referred to as "ionic agitation". Ionic agitation is analogous to poking a stick into a hornet's nest, with the stick representing the external stimulus and the hornets representing ions.

When the external voltage, current or load is removed from the cell, the cell begins to return to the state of ionic rest. This return process from agitation to rest is called "ionic relaxation." The rate at which the cell "relaxes" may be approximated mathematically as an exponential decay in the form $T=Ce^{-kt}$, where C is a constant proportional to degree of agitation, t is time, and e is the exponential constant. The term k is a constant and may be referred to as the ionic relaxation time constant. It is related to the rate of ionic mobility of the ions in the electrolyte of the cell. Typically, the time required for relaxation under a normal stimulus is somewhere between 30 and 300 seconds.

Ionic relaxation impacts a cell when charging. When a cell is being charged at a high rate, the voltage across the cell increases as the cell absorbs energy. If the charge current is suddenly interrupted, the cell voltage drops a certain amount almost instantly due to an equivalent impedance within the cell. Following the initial drop, the cell voltage will continue to drop exponentially until a lower steady state voltage is reached. This exponential decay is a result of ionic relaxation.

In a similar fashion, when charge current is applied to the cell, the voltage instantaneously increases due to the equivalent series resistance. This initial jump is followed by an exponential increase in voltage due to ionic agitation. These "small signal", exponential, voltage swings are superimposed upon a slower, more linear "large signal" voltage increase that is increased and decreased by energy storage and discharge within the cell.

In addition to energy storage, ionic agitation and relaxation cause resistance and inefficiency when charging cells. When ions are aligning themselves due to energy storage, they "bump into each other" along the way. This interference generates heat and unwanted gas. In order to rapidly charge a battery, one tries to align ions as rapidly as possibly while reducing the incidents of inefficient collisions.

Charging a battery is similar to, and thus may be visualized as, filling a mug with creamy, frothy root beer. Imagine that the mug is the battery, root beer is energy, and the foamy head is an undesirable increase in cell voltage and impedance caused by inefficient agitation. The goal is to fill the glass with root beer as quickly as possible, i.e. fast "charging", without any of the foamy head overflowing the mug. Pouring in one continuous stream is the same as charging a battery with a constant current; it generates a substantial amount of head. If, however, one puts in a little root beer and waits for the head to disappear (i.e. allow ionic relaxation to take place), then puts in another burst and so on, the glass can be filled (or battery can be charged) much more quickly. This is the motivation behind pulse charging in order to rapidly charge batteries.

Prior art ionic relaxation solutions, like U.S. Pat. No. 5,808,447, teach an ionic relaxation method that operates thusly: Charge a cell to a maximum voltage and turn the charger off (e.g. charge a single cell to 4.2 volts and stop). Wait until the battery voltage has drooped below a threshold (e.g. wait until the battery drops below 3.9 volts). Turn the charger back on. Repeat.

While this solution is better that simply dumping a large amount of current into a cell, it would be advantageous to have even faster charging methods due to the frustrations listed in the first paragraph. After all, no one likes sleeping on the sofa. There is thus a need for an improved pulse charging method for rechargeable batteries.

DETAILED DESCRIPTION OF THE INVENTION

Figure 1:
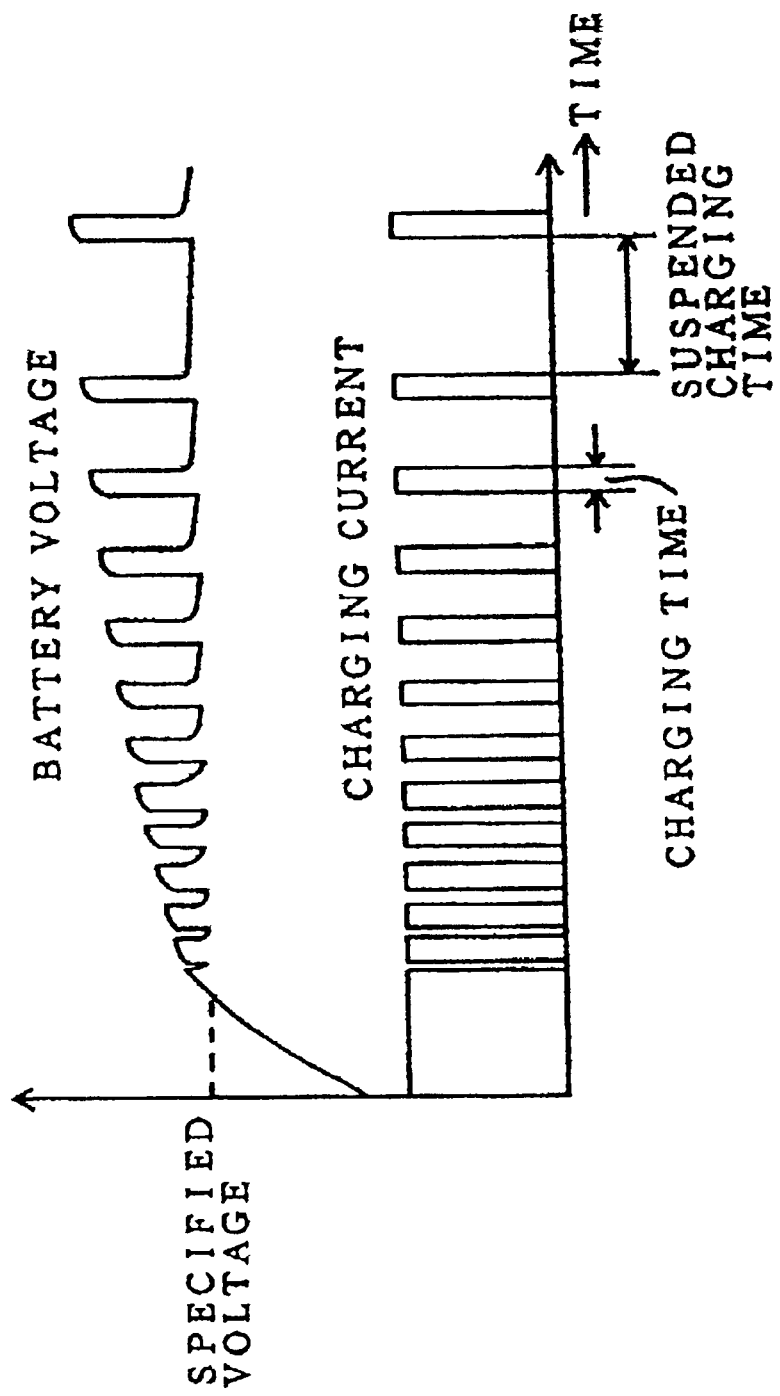
FIG. 1 illustrates a prior art, pulse charging method.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

The notion of pulse charging to reduce ionic disturbances is not new in the art. With any pulse charging system, however, a designer must decide when to turn the charging current on and off. As for turning it off, the answer is relatively simple, as it is driven by the termination voltage of the cell. Nearly all lithium-based cells have a maximum voltage beyond which they cannot be charged. If they are charged beyond the termination voltage, combustible gasses may be released within the cell. In the presence of high temperatures, such gasses may compromise reliability of the cell. For a typical single cell, lithium battery, this termination voltage is 4.1–4.2 volts. For cells coupled in series, the the first cell to reach the predetermined termination voltage determines charge termination for the cumulative pack. Thus, when any one cell reaches the termination voltage, the charger must turn off.

The question remains: When do you turn the charger back on? Typical prior art solutions, suggest waiting for the voltage to drop below a predetermined threshold, as this is indicative of a sufficient amount of ionic relaxation. For instance, in a typical single-cell application, one may wait until the cell had dropped from 4.1 to 3.9 volts. By way of example, U.S. Pat. No. 5,808,447 discloses such a prior art method. FIG. 1 illustrates the current and voltage waveforms associated with this method.

The present invention offers a new method of determining when to turn on the charging circuit. The invention greatly reduces charging time when compared to the fixed "specified voltage" turn on point of the prior art. The invention is easy to implement, with simple circuitry. In addition to reducing the charging time, the invention increases the energy storage efficiency for any given period of charging.

Figure 2:
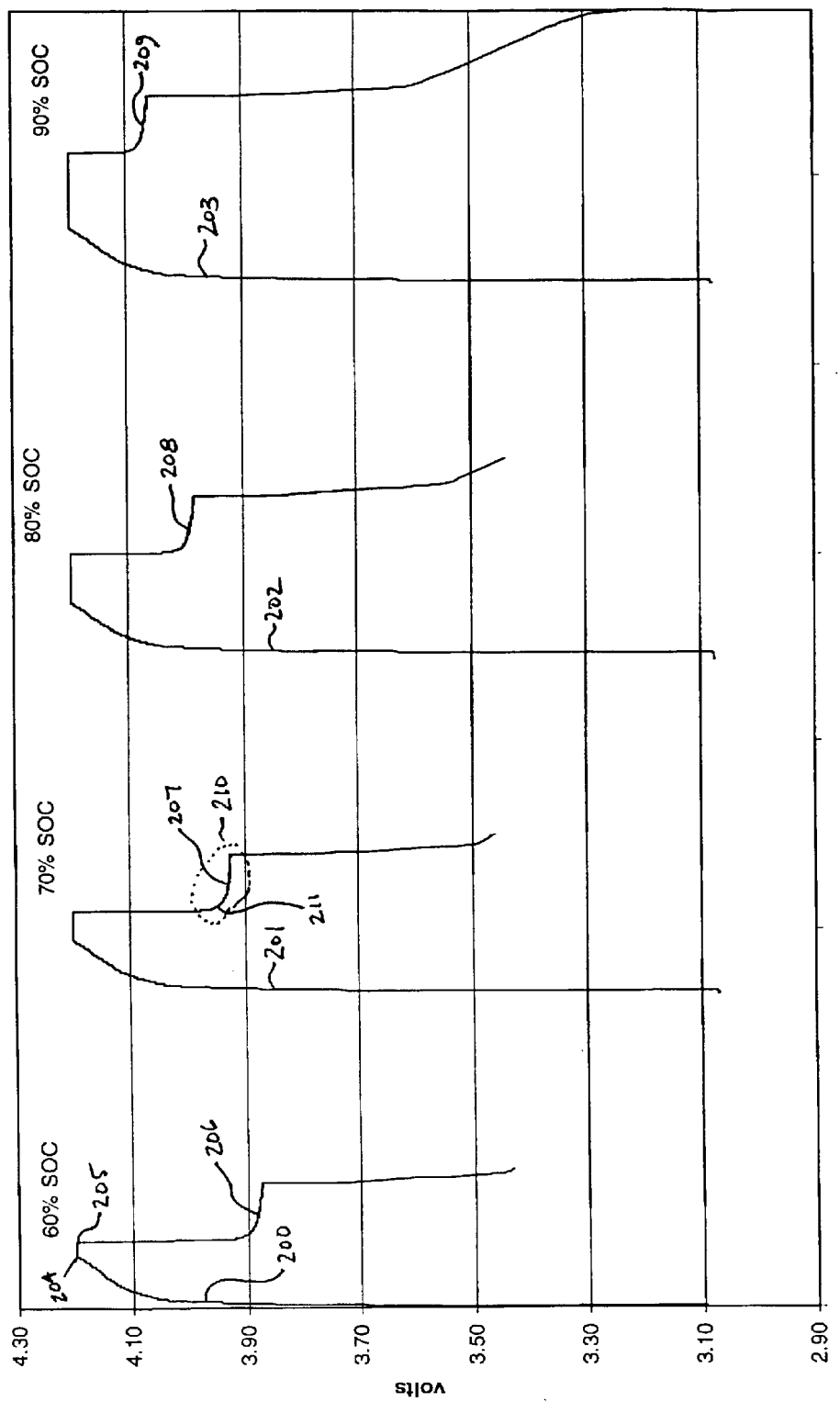
FIG. 2 illustrates a test waveform demonstrating differing ionic relaxation decay voltages for different energy storage amounts in the same battery.

Referring now to FIG. 2, illustrated therein is a test waveform illustrating differing ionic relaxation decay for different energy storage amounts in the same battery. Through experimental analysis, Applicants discovered that the voltage decay due to ionic relaxation changes depending upon the amount of energy stored within the cell. In effect, the "C" value changes in the $T=Ce^{-kt}$ equation, because as the cell stores energy, fewer ions remain free to become agitated. Armed with this information, the present invention was developed.

In FIG. 2, four exemplary waveforms 200–203 are shown. These waveforms were each generated with the following test: A rechargeable lithium ion cell was charged with a constant-current-constant-voltage supply. (Constant-current-constant-voltage supplies are well known in the art. By way of example, U.S. Pat. No. 6,087,810, entitled "Constant current and constant voltage battery charger", issued Jul. 11, 2000, incorporated herein by reference, discloses such a supply.) As each cell was charged, a coulomb-counter type fuel gauge monitored the energy being stored within the cell. Once the cell reached a predetermined energy storage level, the charge circuit was opened, and the voltage was monitored. It was discovered that the depth of ionic relaxation changes with the state of charge of the cell.

For example, the cell represented by curve 200 was charged at a constant current until the cell reached 4.2 volts. At this point 204, the charging circuit moved into its constant voltage mode, thereby reducing the current to prevent the cell from exceeding 4.2 volts. Once the cell was at 60% capacity 205, as determined by the fuel gauge, the charge circuit was opened. Due to ionic relaxation, the voltage of the cell decayed exponentially to roughly 3.85 volts at point 206.

When the test was repeated to 70% charge (curve 201), the voltage relaxed to about 3.95 volts at point 207. Likewise, the relaxation voltage was approximately 4 volts at 80% charge (point 208), and 4.05 volts at 90% charge (point 209). FIG. 2 thus illustrates that the relaxation voltage increases with capacity charge.

Figure 3:
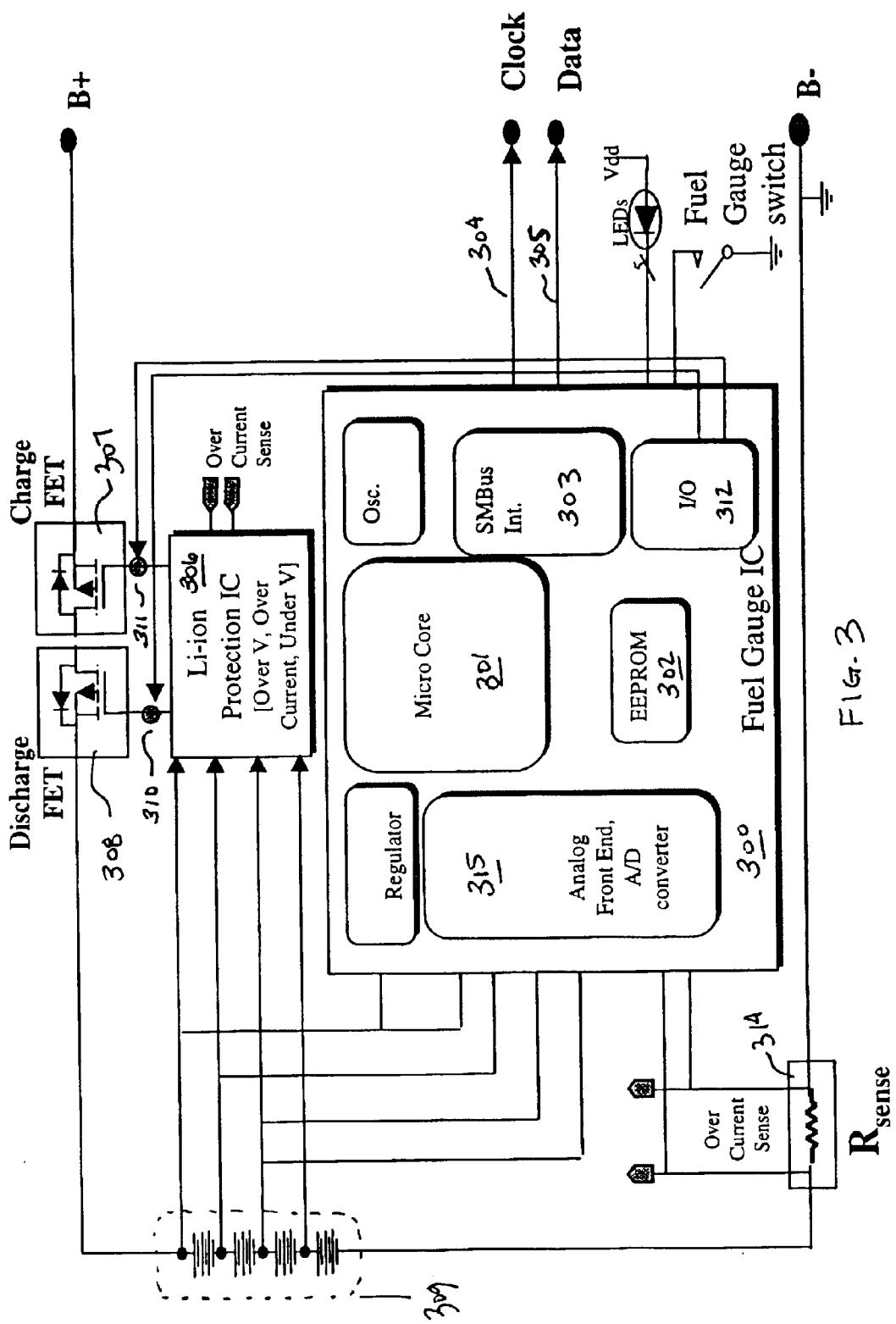
FIG. 3 illustrates a preferred embodiment of a pulse charging circuit in accordance with the invention.

This invention uses the circuit of FIG. 3 to implement a pulse charging method that determines when to turn on the charging circuit based upon status of charge of the cell. As most modern rechargeable batteries (particularly those designed for portable computers) include fuel-gauging circuits, battery capacity is generally known at all times during the charging process. In its simplest form, using the single cell application for exemplary purposes, this invention operates as follows: the charging circuit is turned on until the cell reaches its termination voltage. The charging circuit is then turned off. Immediately after turning off the charging circuit, charge status information is read from the fuel gauge. This charge status information is then compared to profile data stored as a look-up table in a memory to determine what voltage at which to turn back on the charging circuit. For example, using the data from FIG. 2, if the cell were 80% charged, the charging circuit would turn on when the cell reached 4.0 volts. The process then repeats. By dynamically changing the threshold at which the charging circuit is turned on, the wait time is reduced, thereby increasing charging efficiency.

Referring now to FIG. 3, illustrated therein is a preferred embodiment of a pulse charging circuit in accordance with the invention. The circuit includes a fuel gauging IC 300 (hereinafter "fuel gauge"). Such ICs are currently available on the market. Examples include the PS401 manufactured by PowerSmart, and the M37516 manufactured by Mitsubishi. The fuel gauge 300 includes a microprocessor core 301 that is responsible for running executable code stored in the EEPROM 302. Executable code is loaded into the EEPROM 302 via a standard data interface represented here as the SMBus interface 303. Essentially, data is clocked in on a data line 305 in synch with a clock line 304, using the industry standard SMBus protocol. Once stored in the EEPROM 302, the code becomes embedded firmware for execution by the microprocessor core 301.

A charge protection circuit 306 controls a charge 307 and discharge 308 transistor. An example of such a charge protection circuit is the MM1414 manufactured by Mitsumi. Here, the charge protection circuit 306 is shown regulating four cells 309 coupled in series, but it will be clear that this is for exemplary purposes only. The invention is easily applied to any number and arrangement of cells, depending upon the battery pack application.

The fuel gauge 300 alternately controls the charge 307 and discharge 308 transistors by way of digital "OR" connections 310, 311 coupled to an I/O port 312 on the circuit. A current sense resistor 314 coupled to the on-board A/D converter 315 provides current sensing for coulomb counting and additional overcurrent protection.

During normal charging operation, the charge protection circuit 306 keeps the charge 307 and discharge 308 transistors closed, thereby allowing current to flow from the power supply (not shown) to the cells 309. The charge protection circuit 306 only opens when either an overvoltage situation occurs (the voltage across any one cell exceeds the manufacturer's limit) or an under voltage condition occurs (the voltage across any one cell falls below a minimum operating threshold), or excessive discharge or charge current is detected.

Presuming the cells 309 are initially at a state of charge that is less than full, the charge 307 and discharge 308 transistors remain closed, thereby allowing charging current to flow through the cells 309. As the current is flowing, the fuel gauge 300 constantly monitors the amount of energy stored in the cell via coulomb counting with the current sense resistor 314. When the A/D converter 315 senses that any one cell reaches the upper voltage limit, the fuel gauge 300 opens the charge transistor 307. The microprocessor core 301 then determines the status of charge and compares that to a predetermined profile (representative of a typical cell or standard from that manufacturer, determined in the lab) in a look-up table stored in the EEPROM 302. When the voltage of the cell falls to that particular voltage, the fuel gauge 300 turns the charge transistor 307 back on. The process repeats until the cell is 100% charged. When the state of charge reaches 100% (or within a predetermined percentage of full capacity) the pulse charge may be terminated and/or a full charge indication made to the user.

It is well to note that there are alternative methods to determining when to turn on the charging circuit that offer more precision that the method described above. Referring again to FIG. 2, note that the particular turn-on voltage 207 chosen for that example fell somewhere within the middle of the segment shown in circle 210. Note also that once the voltage passes the "knee" of the curve 211, the decrease in voltage becomes relatively slow. One alternative embodiment of the invention is to sense the change in voltage per unit time, rather than the absolute voltage.

Figure 4:
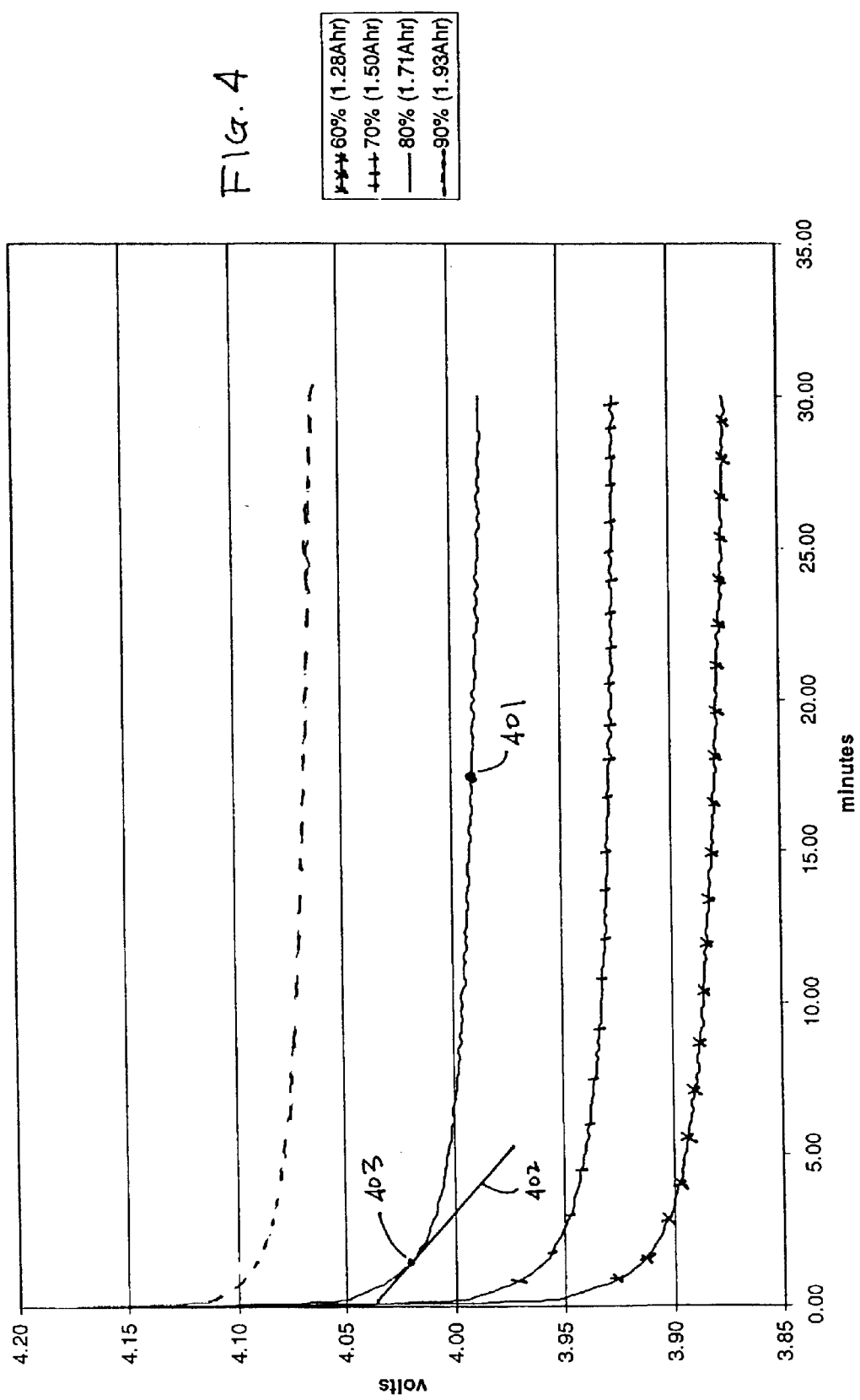
FIG. 4 illustrates four curves representing the ionic relaxation voltages for a single cell, lithiumion battery at 60%, 70%, 80% and 90% capacity.

Referring now to FIG. 4, illustrated therein are the four curves representing the ionic relaxation voltages for a single cell, lithium-ion battery at 60%, 70%, 80% and 90% capacity. By way of example, at 80% capacity, rather that selecting point 401 as an absolute voltage at which to turn on the charging circuit, the delay time may be reduced by using the slope represented by line 402. A preferred slope at which to actuate charging is 6 mV/min, with an acceptable range being between 2 and 20 mV/min. Note that when the voltage reaches the knee 403, most all ionic relaxation has occurred. Thus, by monitoring the change in voltage relative to the change in time, the knee may be identified earlier than the voltage represented by point 401. The net effect is that the non-charging interval of the pulse may be shortened, thereby increasing charging efficiency. For very precise applications, the second derivative of the curve may also be calculated, to identify the knee with utmost precision. In either instance, pulse charge termination and/or full charge indication may be achieved when any of the following occurs: the charge 307 and discharge 308 transistor switching frequency exceeding some maximum threshold; the fuel gauge is within a predetermined percentage of full capacity; the charge 307 and discharge 308 transistor on time has fallen below a predetermined threshold; or a charge timer has expired.

Figure 5:
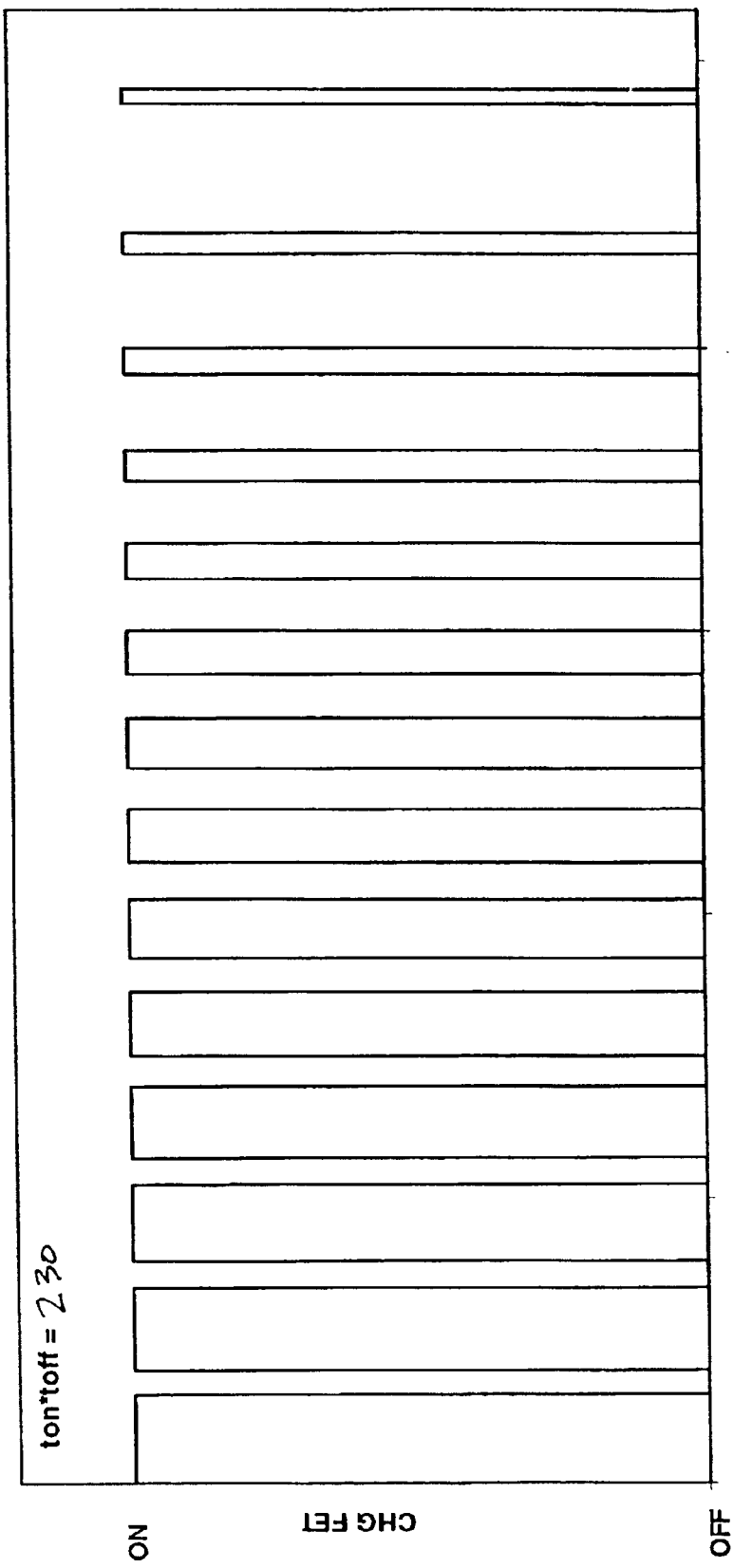
FIG. 5 represents a mathematical approximation of the ionic relaxation method in accordance with the invention.
Figure 6:
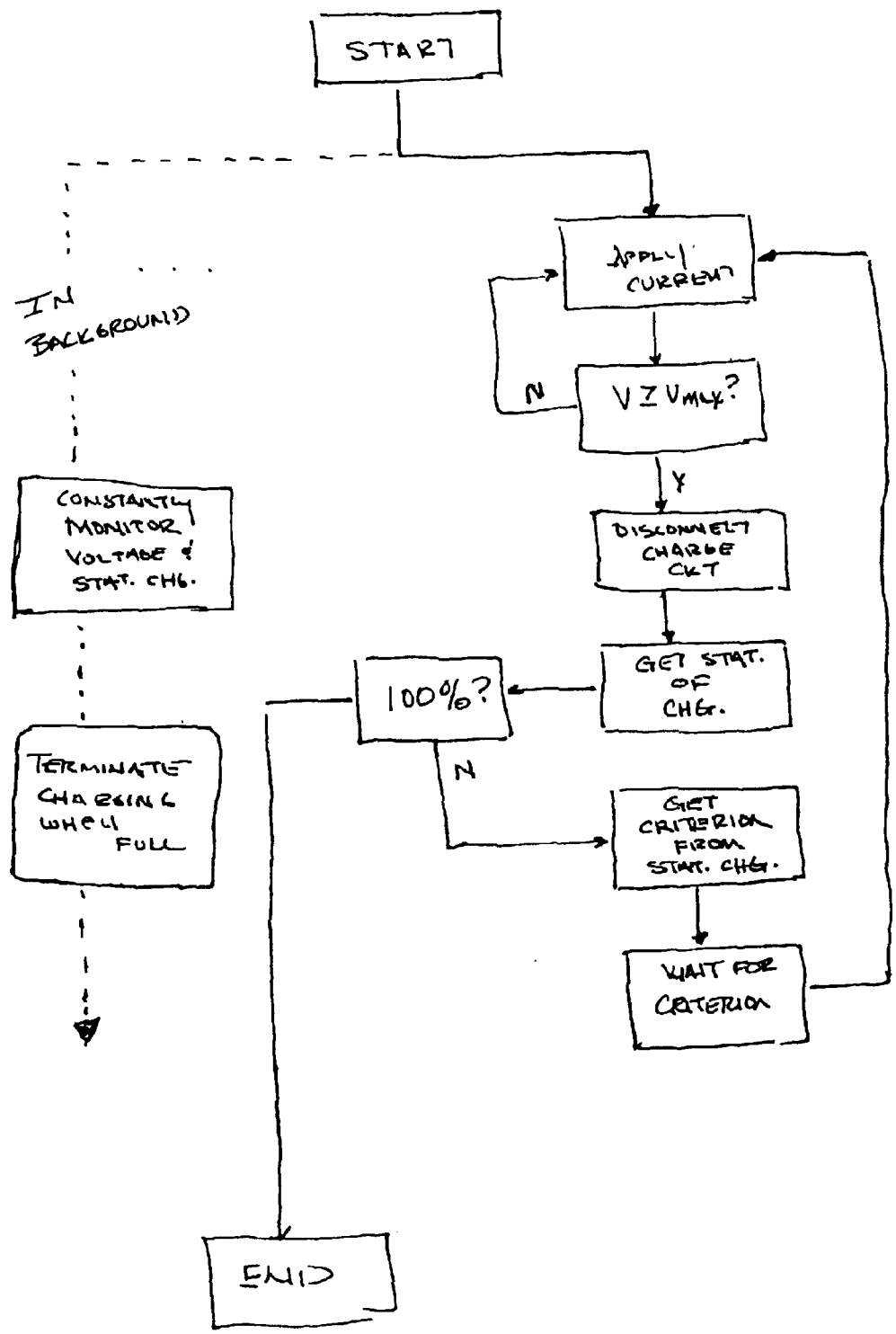
FIG. 6 is an illustration per 37 C.F.R. 1.83.

Some applications may not include the processing power required to constantly monitor the voltage of the cells. Very small, embedded batteries sometimes lack the space required for a fuel gauge with a microprocessor core. For these applications, FIG. 5 represents a rough mathematical approximation of the ionic relaxation methods listed above. In FIG. 5, the non-charging interval is represented by a constant divided by the length of the charging interval. Experimental results have shown that a constant between 100 and 500 represents the dynamic on-voltage method described above. A constant of 230 is preferred. Using this constant, a timer would monitor the length of time that the cells were being charged. When the cells hit their predetermined maximum, the charging circuit would be disconnected for a time roughly equivalent to the constant divided by the on time. This constant method offers a simplified way to employ the invention without the need of constantly sensing cell voltage. The pulse charge may be terminated and/or full charge indicated if any of the following occurs: the charge 307 and discharge 308 transistor on-time falls below a minimum threshold; the charge 307 and discharge 308 transistor off-time exceeds a maximum threshold; or a charge timer has expired.

While the preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. For example, while a lithium cell having a termination voltage of 4.2 volts has been used as an example, it will be clear that the invention could extend to various other types of cells, each with different operating criteria.

What is claimed is:

1. A method for charging a rechargeable cell, the method comprising the steps of:
   a. monitoring stored energy in at least one rechargeable cell;
   b. monitoring a voltage across the at least one rechargeable cell;

c. applying a charging current to the at least one rechargeable cell;

d. decoupling the charging current from the a least one rechargeable cell when the voltage across the at least one rechargeable cell reaches a predetermined maximum;

e. determining the amount of stored energy in the at least one rechargeable cell;

f. selecting a criterion based upon the amount of energy stored in the at least one rechargeable cell;

g. waiting until the criterion is met; and h. coupling the charging current to the at least one rechargeable cell.

2. The method of claim 1, wherein the criterion corresponds to the amount of energy stored in the at least one rechargeable cell.

3. The method of claim 2, wherein the criterion comprises a voltage threshold.

4. The method of claim 3, wherein:

a. when the at least one cell is 60% charged, the voltage threshold is between 88 and 98 percent of the predetermined maximum;

b. when the at least one cell is 70% charged, the voltage threshold is between 92 and 98 percent of the predetermined maximum;

c. when the at least one cell is 80% charged, the voltage threshold is between 94 and 98 percent of the predetermined maximum; and d. when the at least one cell is 90% charged, the voltage threshold is between 96 and 98 percent of the predetermined maximum.

5. The method of claim 4, wherein charging is terminated when energy stored in the at least one rechargeable cell reaches a predetermined percentage of full capacity.

6. The method of claim 2, wherein the criterion comprises a change in voltage across the at least one rechargeable cell per unit time.

7. The method of claim 6, wherein the change in voltage across the at least one rechargeable cell per unit time is between 2 and 20 millivolts per minute.

8. The method of claim 7, wherein charging is terminated when an event occurs, wherein the event is selected from the group consisting of a pulse charge frequency exceeding a predetermined threshold, energy stored in the at least one rechargeable cell reaching a predetermined percentage of full capacity, a pulse charge on time falling below a predetermined threshold, and expiration of a timer.

9. The method of claim 2, wherein the criterion comprises a change in the change in voltage across the at least one rechargeable cell per unit time.

10. The method of claim 3, 6 or 9, further comprising the step of providing a circuit comprising:

a. a fuel gauge comprising a microprocessor core and a memory; and b. at least one transistor.

11. A method for charging a rechargeable cell, the method comprising the steps of:

a. monitoring a voltage across the at least one rechargeable cell;

b. applying a charging current to the at least one rechargeable cell;

c. measuring the time that the charging current is applied to the at least one rechargeable cell;

d. decoupling the charging current from the a least one rechargeable cell when the voltage across the at least one rechargeable cell reaches a predetermined maximum;

e. dividing a constant by the time that the charging current is applied to the at least one rechargeable cell to determine a wait time;

f. waiting for the wait time; and g. coupling the charging current to the at least one rechargeable cell.

12. The circuit of claim 11, wherein the constant is between 200 and 300.

13. The method of claim 12, wherein charging is terminated when an event occurs, wherein the event is selected from the group consisting a pulse charge off-time exceeding a predetermined threshold, energy stored in the at least one rechargeable cell reaching a predetermined percentage of full capacity, a pulse charge on time falling below a predetermined threshold, and expiration of a timer.

* * * * *